(12) United States Patent
Mochary et al.

(10) Patent No.: US 7,664,639 B2
(45) Date of Patent: Feb. 16, 2010

(54) APPARATUS AND METHODS FOR SPEECH RECOGNITION

(75) Inventors: Ran Mochary, Nes Ziona (IL); Eran Dukas, Tel Aviv (IL)

(73) Assignee: Art Advanced Recognition Technologies, Inc., Lawrenceville, GA (US)

( * ) Notice: Subject to any disclaimer, the term of this patent is extended or adjusted under 35 U.S.C. 154(b) by 1228 days.

(21) Appl. No.: 10/756,828

(22) Filed: Jan. 14, 2004

(65) Prior Publication Data

US 2005/0154596 A1  Jul. 14, 2005

(51) Int. Cl.
*G10L 15/00* (2006.01)
(52) U.S. Cl. .................................... 704/238
(58) Field of Classification Search ............ 704/238, 704/251, 275; 379/211.02, 221.13, 221.14, 379/88.01–88.03
See application file for complete search history.

(56) References Cited

U.S. PATENT DOCUMENTS

| | | | | |
|---|---|---|---|---|
| 5,995,926 | A * | 11/1999 | Gupta et al. ............... | 704/240 |
| 6,012,028 | A * | 1/2000 | Kubota et al. .............. | 704/260 |
| 6,134,319 | A * | 10/2000 | Burg et al. ................. | 379/354 |
| 6,519,479 | B1 * | 2/2003 | Garudadri et al. .......... | 455/563 |
| 6,922,669 | B2 * | 7/2005 | Schalk et al. ............... | 704/255 |
| 2002/0072917 | A1 * | 6/2002 | Irvin et al. ................ | 704/270.1 |
| 2002/0076009 | A1 | 6/2002 | Denenberg et al. | |

FOREIGN PATENT DOCUMENTS

EP    0661688    7/1995

OTHER PUBLICATIONS

World Telephone Numbering Guide: www.wtng.info, Aug. 23, 2004.
North American Numbering Plan Administration: www.nanpa.com, Aug. 23, 2004.
www.nanpa.com/number_resource_info/index.html, Sep. 23, 2004.
www.nanpa.com/number_resource_info/vertical_service.html, Sep. 23, 2004.
www.nanpa.com/number_resource_info/vsc_assignments.html, Sep. 23, 2004.
www.gsmworld.com/roaming/gsminfo/index.shtml, Aug. 23, 2004.
www.cdg.org/technology/roaming.asp, Aug. 23, 2004.

* cited by examiner

*Primary Examiner*—Michael N Opsasnick
(74) *Attorney, Agent, or Firm*—Chapin IP Law, LLC

(57) ABSTRACT

A telephone dialing speech recognition method includes determining a location associated with a cellular telephone from geographic indications provided by the cellular telephone, and selects associated search information as a function of the location. Speech based dialers operating in a car environment often have difficulty determining the digits said since some digits have similar sounding names in certain languages. To improve recognition performance, constraints are added to the recognition process, based on the natural constraints of the dialing process. The method utilizes the selected associated search information when recognizing the incoming speech signal. For speech dialing, if the user defines a location where the phone is used, then the "numbering plan" of that country may be used to constrain certain digits. Such constraining of the speech recognizer significantly improves the recognition results.

31 Claims, 2 Drawing Sheets

APPARATUS AND METHODS FOR SPEECH RECOGNITION

FIELD OF THE INVENTION

The present invention relates to speech recognition generally and to configurable speech recognizers in particular.

BACKGROUND AND SUMMARY OF THE INVENTION

Speech recognition is known in the art. Limited vocabulary speech recognizers operate by matching the incoming speech to a collection of reference speech models and selecting the reference model(s) which best match(es) the incoming speech. Limited vocabulary speech recognizers are used for speech dialing, in which the user says a phone number and the speech recognizer determines which digits were said and provides the recognized digits to the automatic dialing system of a telephone. "Digits" typically include the numerical digits, symbols, such as *, # and +, and pause and editing words such as "clear", "cancel", "dial" and "save". Speech dialers exist on cellular telephones to provide 'hands-free dialing' during driving.

Speech dialers, especially those operating in a car environment, often have difficulty determining the digits said, since some digits have similar sounding names in certain languages. To improve recognition performance, some speech recognition systems add constraints to the recognition process, based on the natural constraints of the dialing process.

For speech dialing, if the user defines the country where the phone is used, then the "numbering plan" of that country may be used to constrain at least some of the digits. For example, the numbering plan of the United States states that the first number of an area code may not be a 0 or a 1. Furthermore, all area codes are comprised of three digits, all exchanges are comprised of three digits, and there are four remaining digits. A more complete numbering plan for the US is listed below, where N is a digit from 2-9 and X is a digit from 0-9 and '-' indicates an end of a phrase:

1 digit number: 0 (operator)
3 digit number: N11
3 digit number: *XX
4 digit number: *XXX
7 digit number: NXX-XXXX
10 digit number: NXX-NXX-XXXX
11 digit number: 1-NXX-NXX-XXXX
11 digit number: 0-NXX-NXX-XXXX If the user says three digits, then the speech dialer, using the numbering plan, can 'guess' that the first digit was either a star (*) or an N. Similarly, if seven digits were said, then the first digit cannot be a zero or a one. This slight constraining of the speech recognizer significantly improves the recognition results. In addition to the hard constraints described above, speech recognizers sometimes apply soft constraints, i.e. all digit sequences are allowed but prior probabilities are used to elevate the probabilities of recognizing certain sequences and reduce the probabilities of others.

In 2003, the websites of the following entities included in them descriptions of various numbering plans:

World Telephone Numbering Guide
North American Numbering Plan Administration
Vertical Service Codes (dialing numbers specific to carriers)

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
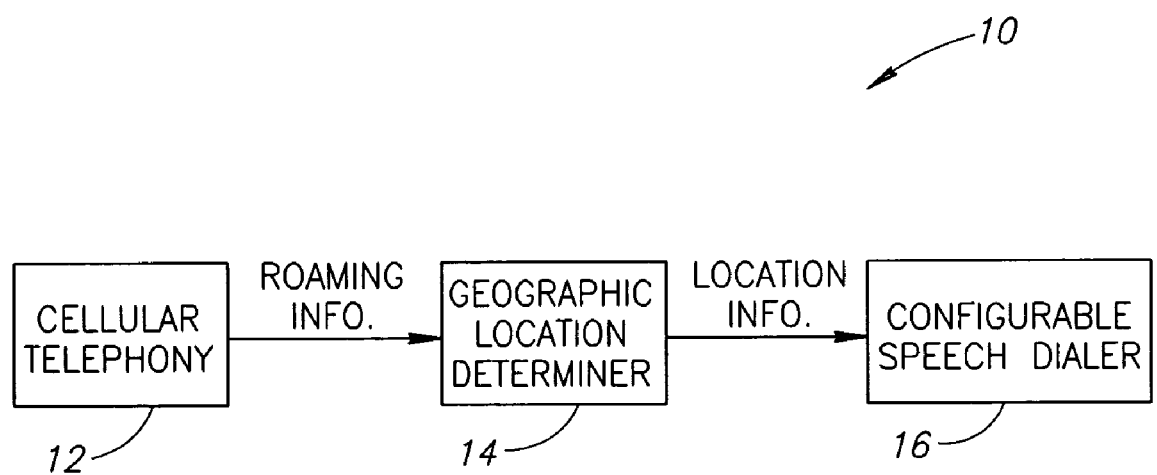
FIG. 1 is a block diagram illustration of an exemplary part of cellular telephone, constructed and operative in accordance with the present invention.

It will be appreciated that, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Cell phones receive geographic information in many forms. Applicants have realized that some of the geographic information may be transferred to a speech recognition system to help it automatically configure the portions of its associated search information which are a function of geography. For example, the associated search information may include the numbering plans of each country and/or dialect information, etc. In the present invention, when the cell phone determines that the user has changed countries, it may pass this information to the speech recognition system which, in turn, may select the appropriate numbering plan for that country. Other geographically related search information, such as dialects, preferred pronunciations, etc., may also be selected.

The geographic information to be used may be of many forms. It may be the location of the current base station with which the cell phone is communicating. In another example, the geographic information may be taken from the operator identification number transmitted when a cell phone may start up or when it may be "roaming", since such includes regional information in it.

Briefly, roaming is the ability of a system to provide the same services to customers ('roamer') from other systems, as is known in the art.

In addition, in the present invention, geographic information may also include operator specific information, such as telephone dialing styles specific to an operator.

Reference is now made to FIG. 1, which illustrates a cellular telephone 10, constructed and operative in accordance with the present invention. Telephone 10 may comprise a cellular telephony unit 12, a geographic location determiner 14 and a configurable speech dialer 16 and may use geographic or operator information to limit the search space of dialer 16. Cellular telephony unit 12 may be the portion of a cellular telephone which may provide the standard cellular telephony services, including the ability to roam from one cellular telephone operator to another. Roaming may also occur when cellular telephony unit 12 may leave the cellular network and may become an extension of a landline system. Such may occur with dual mode GSM/DECT phones. While the user is out of the office or away from home the phone may communicate with the wide-area GSM cellular network. While the user is at home or in the office, the phone may communicate via a wireless DECT base station. Such a phone is known as "one phone anywhere".

Figure 2:
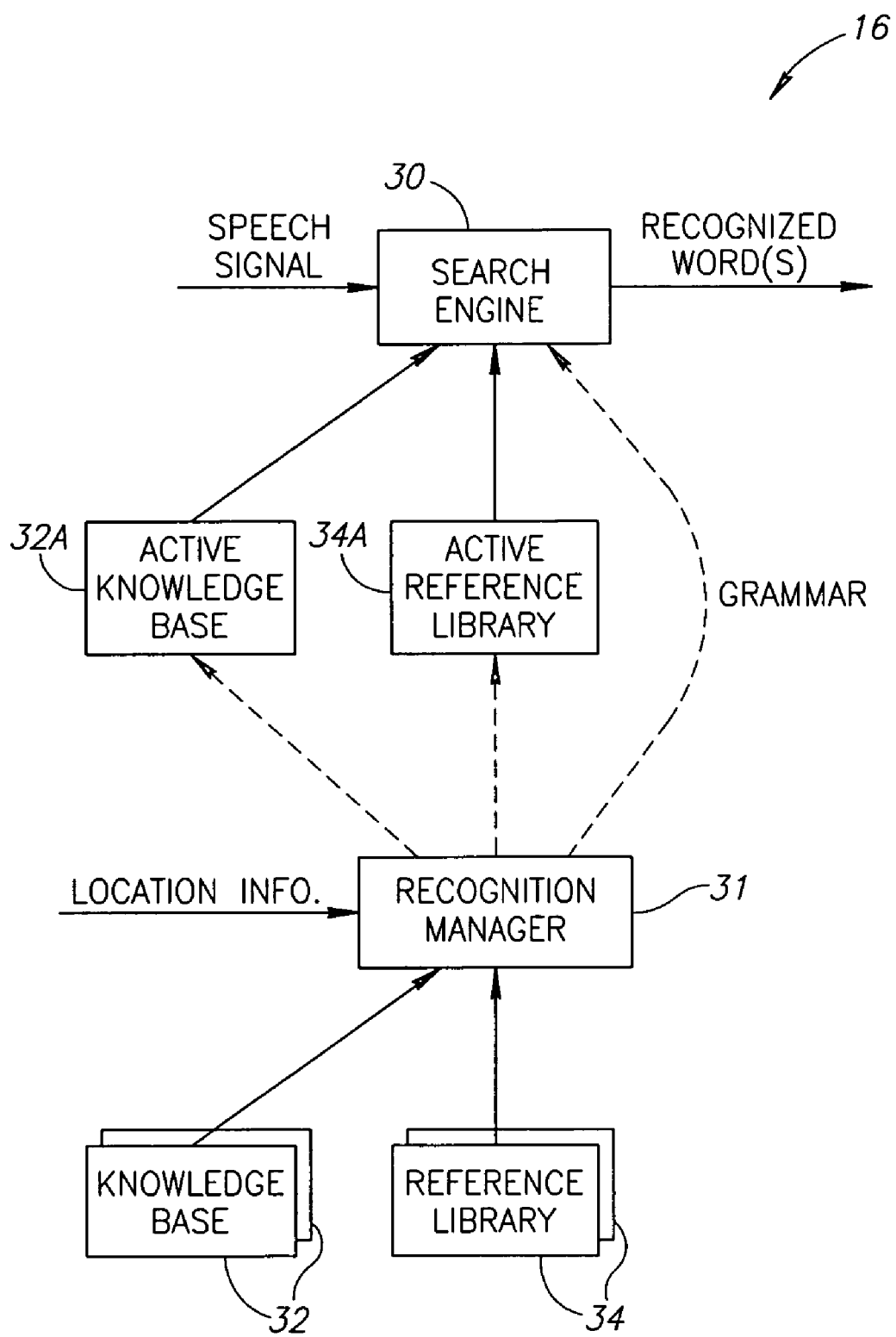
FIG. 2 is a block diagram illustration of a configurable speech recognizer forming part of the telephone of FIG. 1.

Configurable speech dialer 16 may be any speech dialer which may have a multiplicity of constraints therein and which may change these constraints when provided with a configuration signal. An exemplary dialer 16 is shown in FIG. 2, discussed hereinbelow.

When telephone 12 may start up, or when it may roam from one operator area to another, cellular telephony unit 12 may provide geographic location determiner 14 with the geographic (or roaming) information which, in turn, may process it to retrieve the appropriate geographic information. For speech dialer 16, the appropriate geographic information may be the country or region of a country where the cellular telephone operator may be located. Geographic location determiner 14 may pass the country information to speech dialer 16 which may reconfigure itself to use the numbering plan of the new country or region. The numbering plan may also change between cellular and landline operators since many operators may have some additional numbering styles of their own.

Geographic location determiner 14 may process the roaming information to find the portion of it which provides geographic information. Determiner 20 may translate this information into a country or regional identification, or a location indication (home/office vs. external), and may pass this identification to speech dialer 16.

It will be appreciated that the present invention may utilize any geographic information that cellular telephony unit 12 may have. This information may include, but is not limited to, the cellular operator identification number, other roaming information, any GPS information that the cellular telephone may generate, and location information that the cellular telephone may generate from the cellular network.

Reference is now made to FIG. 2 which illustrates an exemplary configurable speech dialer 16. Dialer 16 may comprise a search engine 30, a recognition manager 31, a multiplicity of knowledge bases 32 and a multiplicity of reference libraries 34.

Each knowledge base 32 may contain information about the expected speech patterns for one geographic area. This information may include accents, dialects, preferences for particular words, etc. For example, the preferred way to pronounce the symbol # is "pound" in the United States, but "hash" in the United Kingdom. Likewise, the expected grouping of digits or placement of pauses through the utterance varies according to geographical region; in Canada this may be grouped as 3 digits, 3 digits, then 4 digits, while in France it may be 5 groups of 2 digit numbers. Similarly, the expected way of entering the phone number varies; it may be as one utterance of all the digits as seen in the Motorola Spirit car phone, or as variable size groups of digits and editing commands, as demonstrated on the Siemens Xelibri 3 phone.

Each knowledge base 32 may also contain personalized information, such as the list of the latest dialed phone numbers. Knowledge base 32 may also be updated with the operator or company numbering plan (such as vertical numbers or internal extensions). In addition, for speech dialing, each knowledge base 32 may contain the numbering plan of the geographic area. Knowledge base 32 may either contain pre-stored operator specific numbering plans or a current plan to be used may be transmitted to the phone from the operator. The operator specific numbering plan may contain short-dialing options and vertical service codes specific to the operator. Update of knowledge base 32 may be performed during the manufacturing of the phone, software installation by the operator, and over the air.

Each reference library 34 may contain a set of acoustic models representative of a specific language or regional dialect. Reference libraries 34 may also contain acoustic models representative of different words, according to the preferred way of speaking phone numbers in the geographical area.

Recognition manager 31 may receive the location information from geographic location determiner 14 (FIG. 1) and may select the knowledge base 32A associated with the country, region, cellular telephone operator and/or company information indicated by the location information.

Recognition manager 31 may then supply search engine 30 with the appropriate reference library 34A according to information from the active knowledge base 32A about one or more of: language, accent, dialect and/or region specific words. For example, recognition manager 31 may select active reference library 34A according to regional dialect while various acoustic models within library 34A may be selected according to the preferred pronunciation of various digits and symbols for the location, the expected way of entering phone numbers, and the other information described hereinabove.

Recognition manager 31 may also set the grammar to be used by the search engine according to information from active knowledge base 32A about the numbering plan and/or placement of pauses and/or last dialed calls.

Search engine 30 may attempt to match an incoming speech signal with a set of reference models, such as HMM or template models, stored in active reference library 34A, producing the digits to be dialed as output. Search engine 30 may utilize the information in active knowledge base 32A to constrain the number and type of reference models (from active reference library 34A) to which the input speech signal may be matched using the grammar provided by recognition manager 31.

In another embodiment, search engine 30 may apply soft constraints according to the operator information, the geographic location and/or the numbering plan. In this embodiment, non-numbering plan numbers may not be blocked; however, the recognition of numbering plan numbers may be improved.

In addition, during an editing mode, the current grammar may be changed after each utterance, according to the remaining valid rules. For example, if the allowed numbering plan in the United States is 7 or 10 digits and the speaker has already uttered 3 digits, the grammar may be changed to expect 4 or 7 digits.

It will further be appreciated that speech dialing is only one application of the present invention. There are many other speech recognition operations which may be usefully constrained with geographic information. For example, accents, dialects and vocabulary all vary from one region to another. In another example, some speech recognizers may have to recognize the names of locations. Knowing the general region where a telephone, which will be transmitting the name of a location, is may help to constrain the search space.

For phoneme-based speech recognition tasks, such as name dialing according to the text written in the phonebook, recognition manager 31 may also use the geographical information to set the text to phoneme conversion module of search engine 30. For example, the expected pronunciation of French names in English speaking regions of Canada may be different than the pronunciation in French speaking regions. A geographical cue may be used in this case to introduce prior probability to the text to phoneme module. Additionally, different transcription libraries can be used according to the geographical location.

As can be seen, any speech recognition task which may have some constraints which are geographically related may utilize the present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A configurable speech recognizer comprising:
   a geographic configuration unit to receive roaming indications from a cellular telephone and to process said indications to determine a location associated with said telephone;
   a recognition manager to select associated search information as a function of said location; and
   a speech recognition unit to utilize said selected associated search information when recognizing at least one incoming speech signal, the speech recognition unit utilizing the associated search information as hard constraints, the associated search information identifying hard and soft constraints and the speech recognition unit employing the identified hard constraints for recognizing spoken telephone digits in the incoming speech signal, such that the speech recognition unit:
   determines, based on the determined location, an expected speech pattern indicative of grouping of digits and placement of pauses in the incoming speech signal; and
   derives the soft constraints limiting an expected entered telephone number defined by the spoken telephone digits.

2. The recognizer according to claim 1 and wherein said roaming indications comprise an indication of type of operator, wherein said operator type is one of the following: cellular and landline operator.

3. The recognizer according to claim 1 and wherein said roaming indications comprise operator identification numbers.

4. The recognizer according to claim 1 and wherein said location is a country.

5. The recognizer according to claim 1 and wherein said selector selects said associated search information as a function also of operator identification.

6. The recognizer according to claim 1 and wherein said speech recognition unit comprises a speech dialer.

7. The recognizer according to claim 1 and wherein said speech recognition unit comprises a geographically affected speech recognition unit.

8. The recognizer according to claim 1 and wherein said associated search information comprises a knowledge base and a reference library.

9. The recognizer according to claim 1 and wherein said associated search information comprises a phone numbering plan.

10. The recognizer according to claim 1 and wherein said associated search information comprises dialect information.

11. The recognizer according to claim 1 and wherein said associated search information comprises expected pronunciations.

12. The recognizer according to claim 1 and wherein said speech recognition unit utilizes said associated search information as soft constraints.

13. A configurable speech dialer comprising:
    a speech dialer to recognize speech; and
    a geographic configuration unit to receive roaming indications from a cellular telephone and to provide said speech dialer with a location associated with said telephone,
    said speech dialer to recognize said speech at least according to the numbering plan of said location, the speech recognition unit utilizing the numbering plan and location as hard constraints for recognizing a telephone number defined by said speech, the numbering plan identifying hard and soft constraints and the speech dialer employing the identified hard constraints for recognizing spoken telephone digits in the incoming speech signal, such that the speech dialer:
    determines, based on the determined location, an expected speech pattern indicative of grouping of digits and placement of pauses in the incoming speech signal; and
    derives the soft constraints limiting an expected entered telephone number defined by the spoken telephone digits.

14. The dialer according to claim 13 and wherein said roaming indications comprise operator identification numbers.

15. The dialer according to claim 13 and wherein said location is a country.

16. The dialer according to claim 14 and wherein said numbering plan comprises an operator specific numbering plan.

17. The dialer according to claim 13 and wherein said speech dialer utilizes said numbering plan as hard constraints.

18. The dialer according to claim 13 and wherein said speech dialer utilizes said numbering plan as soft constraints.

19. A speech recognition method comprising:
    determining a location associated with a cellular telephone from roaming indications provided by said cellular telephone;
    selecting associated search information as a function of said location; and
    utilizing said selected associated search information when recognizing at least one incoming speech signal, further comprising utilizing the associated search information as a hard constraint for recognizing a telephone number defined by the incoming speech signal, the associated search information identifying hard and soft constraints and the speech recognition unit employing the identified hard constraints for recognizing spoken telephone digits in the incoming speech signal, such that the speech recognition unit:
    determines, based on the determined location, an expected speech pattern indicative of grouping of digits and placement of pauses in the incoming speech signal; and
    derives the soft constraints limiting an expected entered telephone number defined by the spoken telephone digits.

20. The method according to claim 19 and wherein said roaming indications comprise an indication of type of operator, wherein said operator type is one of the following: cellular and landline operator.

21. The method according to claim 19 and wherein said roaming indications comprise operator identification numbers.

22. The method according to claim 19 and wherein said location is a country.

23. The method according to claim 19 and also comprising selecting said associated search information as a function also of operator identification.

24. The method according to claim 19 and wherein said associated search information comprises a knowledge base and a reference library.

25. The method according to claim 19 and wherein said associated search information comprises a phone numbering plan.

26. The method according to claim 19 and wherein said associated search information comprises dialect information.

27. The method according to claim 19 and wherein said associated search information comprises expected pronunciations.

28. The method according to claim 19 and wherein said recognizing comprises utilizing said associated search information as hard constraints.

29. The method according to claim 19 and wherein said recognizing comprises utilizing said associated search information as soft constraints.

30. The method of claim 1 wherein the speech recognition unit applies the identified hard constraints to spoken digit positions in the incoming speech signal to constrain the received spoken telephone digits.

31. The method of claim 1 wherein the speech recognition unit:
identifies a numbering plan based on the location; and
modifies an expected grammar according to the hard constraints defined by the numbering plan.

* * * * *

UNITED STATES PATENT AND TRADEMARK OFFICE
CERTIFICATE OF CORRECTION

| | | |
|---|---|---|
| PATENT NO. | : 7,664,639 B2 | Page 1 of 1 |
| APPLICATION NO. | : 10/756828 | |
| DATED | : February 16, 2010 | |
| INVENTOR(S) | : Mochary et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1736 days.

Signed and Sealed this

Thirtieth Day of November, 2010

David J. Kappos
*Director of the United States Patent and Trademark Office*